(No Model.)

F. H. ADSIT.
DEHORNING SHEARS.

No. 514,803.

Patented Feb. 13, 1894.

Witnesses
A. Ruppert
H. A. Daniel

Inventor
Frank H. Adsit
Per
Thomas P. Simpson
Attorney

United States Patent Office.

FRANK H. ADSIT, OF GENEVA, PENNSYLVANIA.

DEHORNING-SHEARS.

SPECIFICATION forming part of Letters Patent No. 514,803, dated February 13, 1894.

Application filed May 6, 1893. Serial No. 473,226. (No model.)

*To all whom it may concern:*

Be it known that I, FRANK H. ADSIT, a citizen of the United States, residing at Geneva, in the county of Crawford and State of Pennsylvania, have invented a certain new and useful Dehorning-Shears; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to animal shears and has for its special object the excision of the horns of cattle so as to prevent them from doing injury to one another or other stock.

The invention consists in the form and connection of two end-pivoted blades so that a powerful hand-leverage may be obtained on opposite sides of the horn, causing each blade to cut half through the horn in a plane adjoining and parallel to the other.

Figure 1:
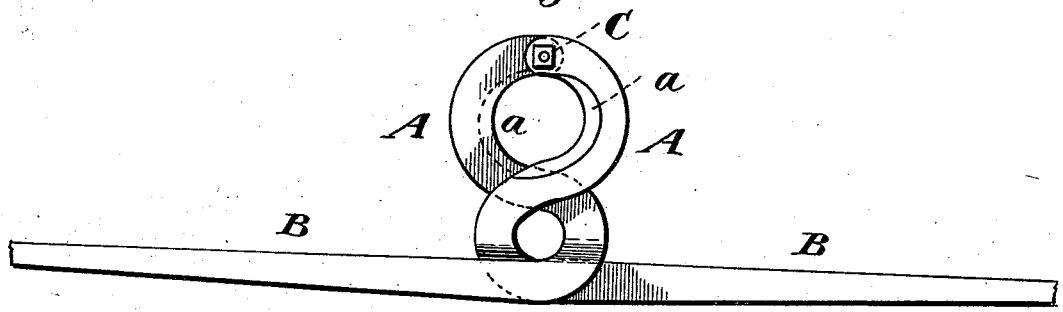
Figure 2:
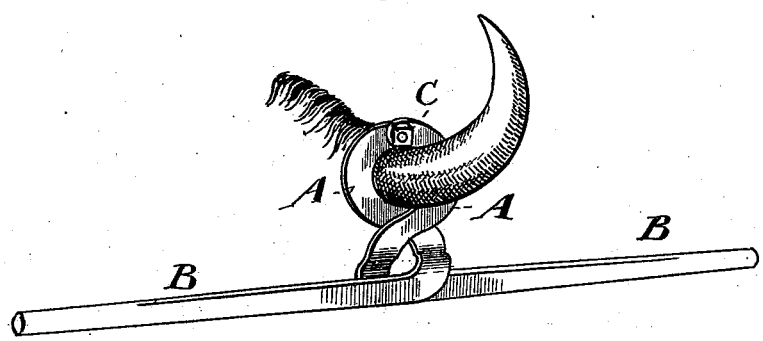
Figure 3:
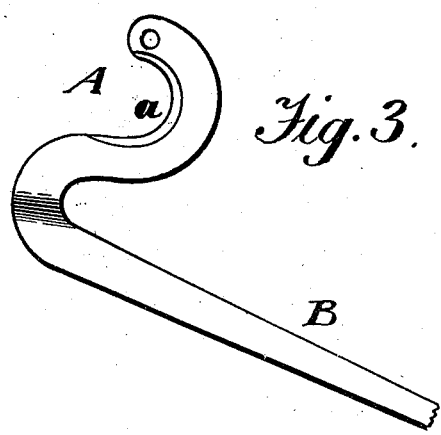

Figure 1 of the drawings is a plan view of the animal shears when open and ready to be applied to the horn; Fig. 2 showing the instrument in perspective and applied to the horn, and Fig. 3 a detail view of one of the blades.

In the drawings, A A represent two S-shaped flat blades with corresponding handles B B, and connected by a pivot bolt C carrying a nut on its end. I might use a rivet under ordinary circumstances but a detachable bolt is more convenient where the animal has a loop or crumple horn or one which grows back on the head. The cutting edges $a\ a$ of the two blades are beveled on opposite sides so as to bring them not only in parallel but in adjoining planes, one resting upon and traveling on the other.

It will be observed that the two blades cross each other twice and in opposite directions so that the cutting may be done by bringing the handles together, while the curvilinear form of the cutting edges enables them to operate by a draw-cut and thus to minimize the labor.

Having thus described all that is necessary to a full understanding of the invention, what I claim as new, and desire to protect by Letters Patent, is—

The described dehorning shears formed of two S-shaped blades A A having curvilinear cutting edges $a\ a$ crossing each other in one direction and handles B B crossing in an opposite direction, the blades being end pivoted and the cutting edges beveled on opposite sides substantially as shown, for the purpose set forth.

In testimony whereof I affix my signature in presence of two witnesses.

FRANK H. ADSIT.

Witnesses:
CHAS. E. RICHMOND,
Miss A. A. FAUST.